United States Patent [19]

Kemeny

[11] Patent Number: 5,242,147
[45] Date of Patent: Sep. 7, 1993

[54] MACHINE BASE ISOLATOR

[76] Inventor: Zoltan A. Kemeny, 1919 E. Colgate Dr., Tempe, Ariz. 85283

[21] Appl. No.: 820,749

[22] Filed: Jan. 13, 1992

[51] Int. Cl.⁵ .............................................. F16F 7/00
[52] U.S. Cl. .................................. 248/638; 248/635; 267/141.1; 267/294
[58] Field of Search ............... 248/638, 635, 632, 634, 248/636; 267/153, 141.1, 294

[56] References Cited

U.S. PATENT DOCUMENTS

| | | | |
|---|---|---|---|
| 1,977,896 | 10/1934 | Saurer | 248/635 |
| 2,399,414 | 4/1946 | Wells et al. | 248/635 |
| 2,660,386 | 11/1953 | Munro | 248/638 X |
| 2,660,387 | 11/1953 | Roy | 248/638 X |
| 2,708,560 | 5/1955 | Paley | 248/632 X |
| 4,773,632 | 9/1988 | Härtel | 248/636 X |
| 5,046,700 | 9/1991 | Hoshino | 248/638 |

FOREIGN PATENT DOCUMENTS

498598 12/1953 Canada .............................. 267/294

*Primary Examiner*—Karen J. Chotkowski
*Attorney, Agent, or Firm*—Cahill, Sutton & Thomas

[57] ABSTRACT

A machine base isolator incorporates a plurality of elastomeric pads separated by steel separating disks. A bolt passes through the center of the pads and separating disks and is secured to a machine base; the opposite end of the bolt is imbedded within an enclosure filled with an elastomeric material. The top of the elastomeric material is covered by a reference plate having an opening large enough to permit the passage of the bolt but not large enough to permit the passage of the bolt head, thus creating an interlocking joint to prevent separation of the bolt from the reference plate. The reference plate is secured to a base plate which in turn is attached to an underlying supporting surface such as a concrete floor. The elastomeric pads are selected from an elastomeric material and configured to provide a predetermined natural frequency or period approximately corresponding to a desired frequency. The characteristics of the elastomeric material configured in the described manner provides a machine base isolator having a design frequency relatively unaffected by the variations in mass or weight that the isolator is required to support.

11 Claims, 3 Drawing Sheets

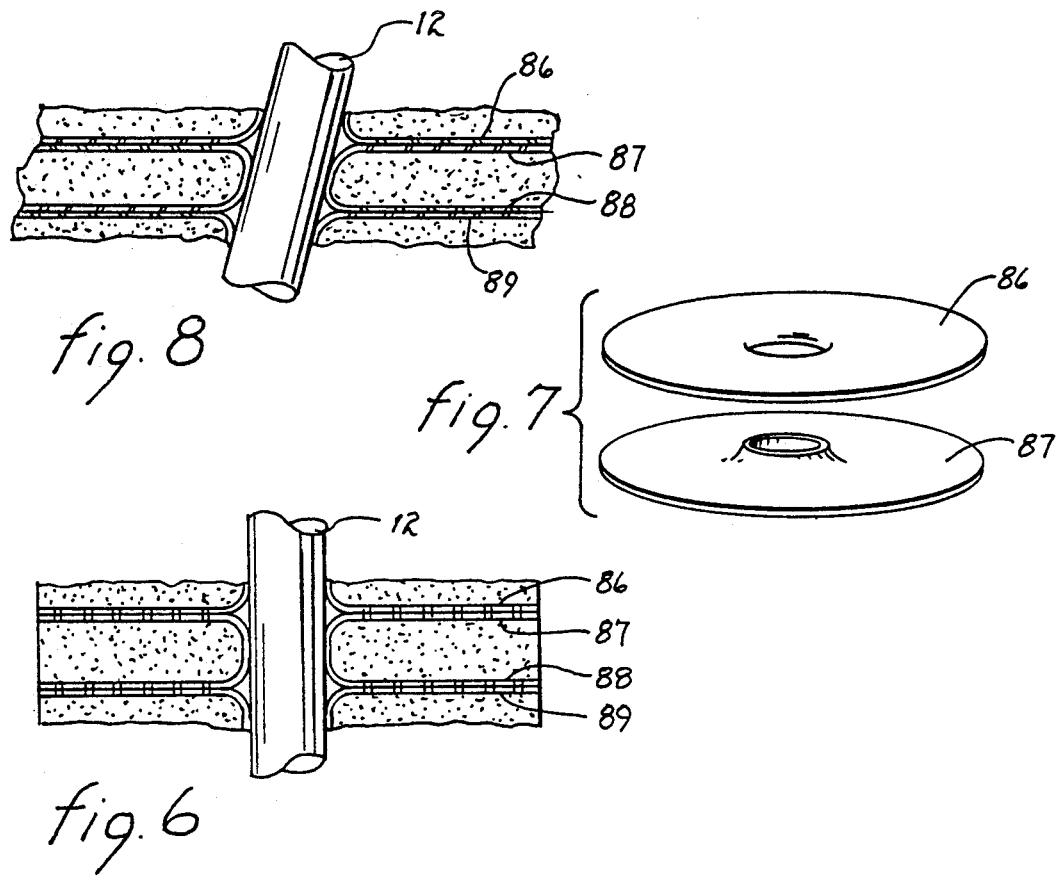
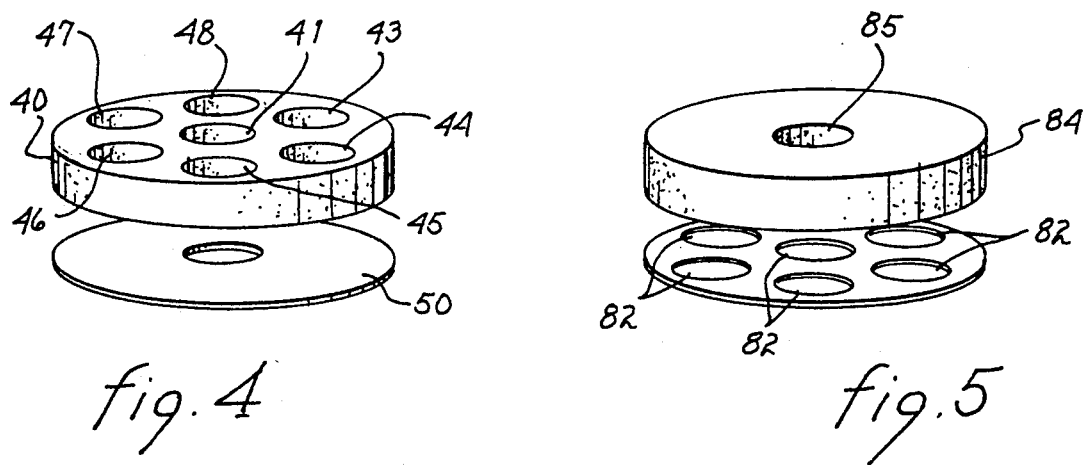

MACHINE BASE ISOLATOR

FIELD OF THE INVENTION

The present invention relates to machine base isolators, and more particularly, to machine isolators for providing seismic and vibration isolation.

BACKGROUND OF THE INVENTION

It is common for machinery and various powered equipment found in shops and factories to be mounted on isolation springs or mounts to dampen the transmission of machine vibrations to the floor. As equipment becomes heavier and more complex, the design of such isolators frequently fails to provide the intended isolation. Such isolators, sometimes referred to as base isolators, are usually designed to be placed in an environment wherein the principal vibrations emanating from a mounted machine or equipment group is within a known frequency range. The isolators are ideally designed having a natural frequency or period approximating the frequency of the machine vibration that the isolator is intended to dampen or isolate. The use of metal springs, for example, permits the design of an isolator having a predetermined fundamental frequency; however, that frequency is proportional to the square root of the mass of the machine that the isolator is to support. Therefore, if more than one isolator is to be used to support the machine (there are always several isolators) the isolators must be designed to provide the desired natural frequency while supporting a predetermined proportion of the machine mass. The mass of a machine or similar equipment is seldom configured or distributed in a manner that machine mounts can each carry the identical weight. Under such circumstances, machine base isolators of the prior art frequently encounter design requirements wherein the position of the isolator results in greater or less weight to be supported by the isolator than similar isolators being used at different positions on the same equipment. If the weight or mass supported by the isolator varies from the mass utilized in its design, the natural frequency of the isolator will be inappropriate for that machine base location. Further, the weight acting on a particular spring varies depending on the specific speed of the machine at any given time; that is, the static and dynamic center of gravity are not necessarily identical.

A machine base isolator that provides a predetermined natural frequency independent of the mass of the machine to be supported would permit such isolators to be utilized at convenient support locations for the machinery and equipment substantially without regard to the proportion of the total mass or weight of the equipment that the individual isolator is to support. The isolator would then function appropriately at the selected frequency or period essentially without regard to the mass that it is supporting.

Seismic disturbances can be particularly devastating to factories and shops having machines and equipment that are displaced during such seismic activity. Prior art machine based isolators designed to attenuate or dampen the transmission of vibration from a machine to a factory floor do not ordinarily provide seismic isolation. Violent seismic activity usually results in the destruction of the isolator mounting with the subsequent movement of the machinery along the factory floor. The crashing of a displaced machine into adjacent equipment or machines can be particularly devastating.

To compensate for this deficiency, prior art techniques have included the utilization of bumpers or "snubbers"; that is, anchors having rubber coatings positioned at predetermined distances from machine bases to limit (but not prevent) the displacement of the machine in response to a seismic disturbance. The difficulty with the utilization of such snubber or bumper techniques is the fact that when the machine strikes the bumper, it has already been placed in motion and thus represents substantial kinetic energy which must be absorbed to bring the equipment or machine to rest. Energy absorption through the utilization of bumpers attempts to dissipate this kinetic energy in a very short distance which by its very nature creates tremendous forces. The force required to decelerate a massive machine that has been, or is being, displaced by seismic motion is usually beyond the strength of all but the most massive bumper systems.

A seismic isolation system would dissipate energy immediately upon lateral acceleration of the machine and would utilize friction induced heat and the energy required in bending mountings to absorb and dissipate energy to prevent movement of the machine beyond the limits of deformation of the machine base isolator.

OBJECTS OF THE INVENTION

It is therefore an object of the present invention to provide a machine base isolator to provide vibration isolation.

It is also an object of the present invention to provide a machine base isolator that provides seismic isolation.

It is still another object of the present invention to provide a machine base isolator for providing both vibration and seismic isolation through the utilization of strategically placed and shaped elastomeric materials.

It is still another object of the present invention to provide a machine base isolator exhibiting a fundamental frequency approximating a predetermined desired machine vibration frequency.

It is still another object of the present invention to provide a machine base isolator exhibiting a desired natural frequency that is essentially independent of the mass or weight that the isolator is to support.

It is another object of the present invention to provide a machine base isolator for seismic and vibration isolation exhibiting a predetermined design natural frequency and which also provides an interlocking configuration to strictly limit lateral motion of the supported equipment or machine during seismic disturbances.

It is another object of the present invention to provide a machine base isolator for seismic and vibration isolation to thereby completely eliminate metal-to-metal contact in the seismic or machine vibration transmission path and to provide a cushioned anchorage for the machine to the floor or underlying supporting surface.

These and other objects of the present invention will become more apparent as the description thereof proceeds.

SUMMARY OF THE INVENTION

The machine base seismic and vibration isolator of the present invention utilizes elastomeric properties arranged in the form of elastomeric pads clamped between a machine base and a reference plate. The elastomeric pads are separated by steel separator plates while each of the pads is provided with a configuration that, combined with the remaining pads, provides a natural frequency or period approximating the design frequency desired for the particular machine application. The elastomeric pads, maintained in a stacked relationship with adjacent pads, are secured to a machine base through the utilization of an attachment means such as a bolt having a head positioned on an opposite side of the reference plate and encased within elastomeric material within an enclosure. The enclosure is secured to a base plate which in turn may be secured such as by bolting to a factory floor. Machine vibrations are effectively isolated from the floor through the deformation of the elastomeric pads; seismic isolation is provided by the energy absorption of the elastomeric material within the enclosure as well as the relative motion between adjacent elastomer pads resulting in the dissipation of energy through friction. Catastrophic seismic disturbances may result in further energy absorption by the base isolator through the plastic deformation of the metal parts, principally the centrally disposed bolt and the reference plate. The stiffness of the elastomeric pads is predetermined to provide a natural frequency or period of the isolator substantially without regard to the mass or weight that the isolator is intended to bear.

BRIEF DESCRIPTION OF THE DRAWINGS

The present invention may more readily be described by reference to the accompanying drawings in which:

FIG. 4 is an isometric view of an elastomeric pad and corresponding steel separator plate showing the details thereof;

FIG. 5 is an isometric view of an alternative construction of the elastomeric pad and corresponding steel separator constructed in accordance with the teachings of the present invention;

FIG. 6 is a cross-sectional view of a portion of a modified elastomeric pad/steel separator configuration useful in describing the action of the elements under seismic influence;

FIG. 7 is an isometric view of steel separator plates utilized in the modified configuration of FIG. 6; and FIG. 8 is a view of the configuration of FIG. 6 shown under the influence of seismic deformation useful in describing the operation of the present invention.

DETAILED DESCRIPTION OF THE PREFERRED EMBODIMENT

Figure 1:
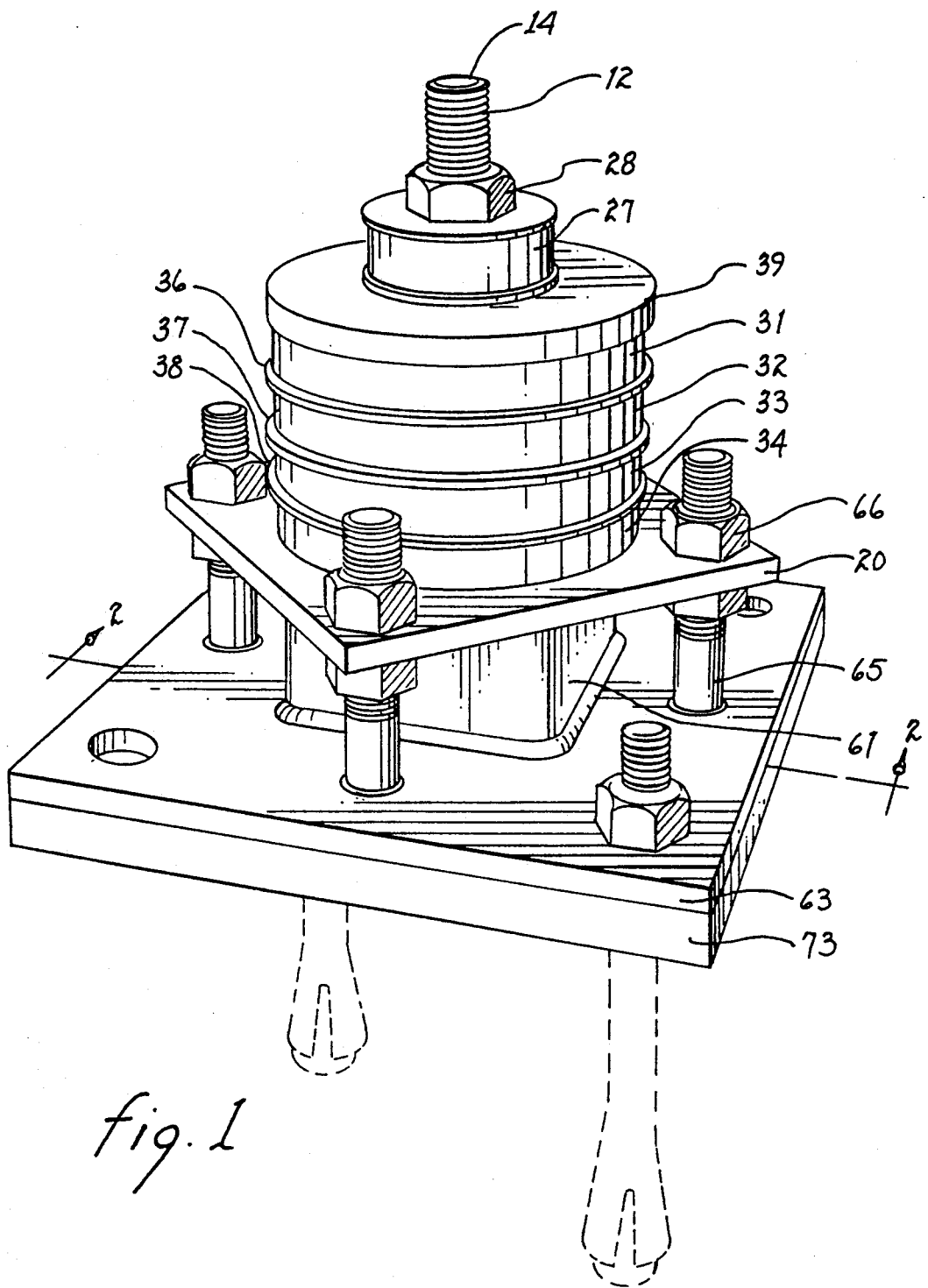
FIG. 1 is a perspective view of a machine base isolator constructed in accordance with the teachings of the present invention.
Figure 2:
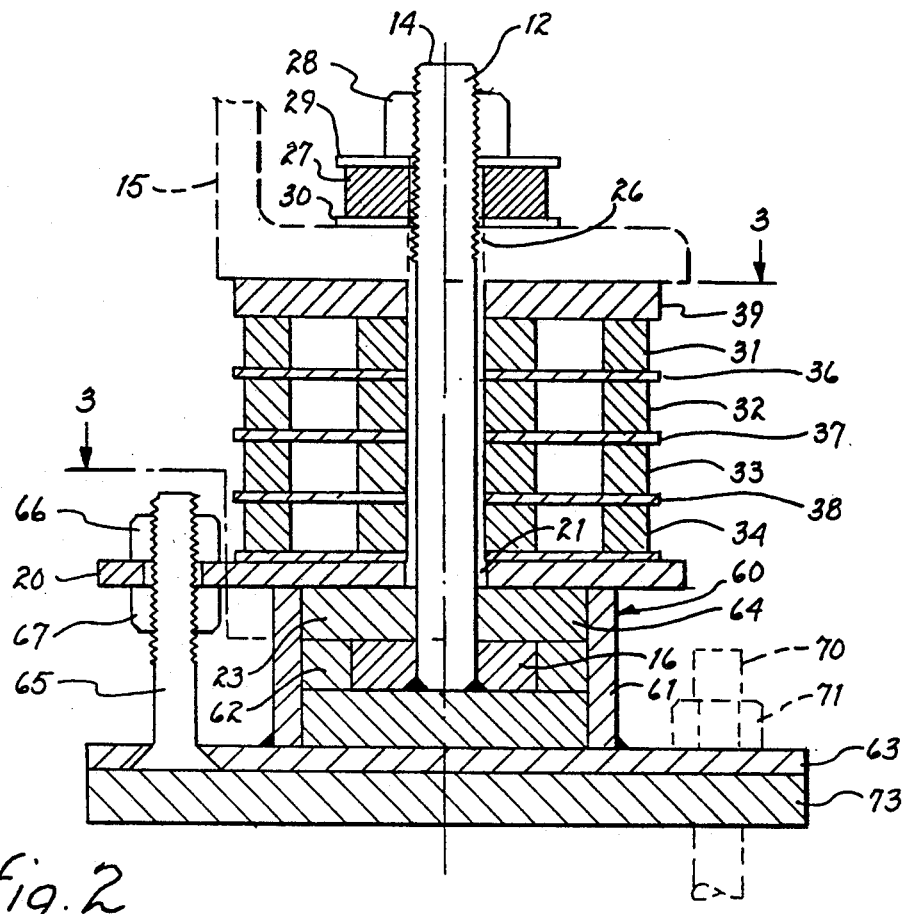
FIG. 2 is a sectional view of the machine base isolator of FIG. 1 taken along line 2—2.
Figure 3:
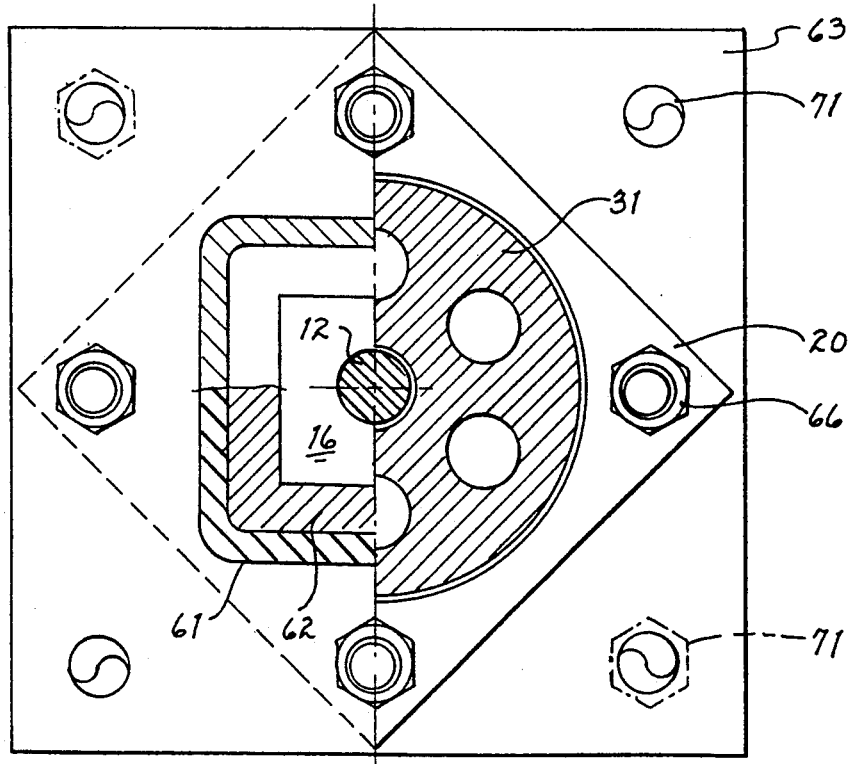
FIG. 3 is a sectional view of the machine base isolator of FIG. 1 taken along line 3—3.

The seismic and vibration isolator mount shown in FIGS. 1, 2 and 3 includes an attachment means 12 which in the embodiment chosen for illustration is a heavy-duty bolt having a first end 14 for coupling to a machine base 15, shown in FIG. 2 by phantom lines; the attachment means or bolt 12 also includes an anchoring end 16 which in the embodiment chosen for illustration may be a large bolt head. The attachment means may take forms other than a simple bolt and may for example include a releasable clamp for clamping to the base of the machine and may include other forms of the anchoring end.

The attachment means extends downwardly through a reference plate 20 having an opening 21 therein to receive the attachment means; however, the opening is too small to permit the passage of the bolt head 16; thus, the attachment means 12 and the reference plate 20 form a keyed interlocking joint. An elastomeric material 23 is positioned between the bolt head and the reference plate.

In the embodiment chosen for illustration the attachment means or bolt 12 extends through an opening 26 provided therefore in the machine base 15 and is coupled to the machine base through the utilization of a heavy duty hex nut 28 spaced from the machine base by fender washers 29 and 30 having an elastic material 27 bonded therebetween. The machine base 15 is spaced from the reference plate 20 through a plurality of elastomeric pads 31, 32, 33, 34 positioned on top of one another and separated by rigid disks such as thin steel separators 36, 37 and 38. The elastomeric pad stack is topped with a plate 39 contacting the bottom of the machine base. Each of the elastomeric pads 31-34 may take a variety of forms such as that shown in FIG. 3 wherein each of the pads comprises a thin cylindrical slab 40 having an appropriately sized opening 41 centrally disposed therein to permit the passage of the bolt therethrough. Each of the pads includes a predetermined number of holes 43-48 circumferentially disposed about the central opening. The metal separators may be solid steel disks such as shown at 50 having an opening to permit the passage of the bolt therethrough and formed of sufficient diameter to insure contact with adjacent elastomeric pads during use when the pads are under compression.

The reference plate 20 contacts the open top of a square or rectangular enclosure 60 having vertically extending sides 61 which are welded or otherwise secured to a base plate 63. The enclosure 60 contains the enlarged head 16 of the bolt as well as elastomeric material 64 positioned between the bolt head 16 and the reference plate 20. In addition, the enclosure is filled with elastomeric material 62 to effectively encase the bolt head. It may be noted that the enclosure is square in the embodiment chosen for illustration with the bolt head correspondingly being square. It should be understood that other geometric configurations may be chosen for these elements.

The reference plate 20 is clamped to the base plate 63 through the utilization of a plurality of studs 65, each of which extends upwardly from the base plate and enables the reference plate to be clamped using hex nuts 66 and 67 tightened on either face of the reference plate. The base plate 63 may in turn be attached to a floor or other suitable structural element through the use of floor bolts 70 and corresponding hex nuts 71. It may be noted that an elastomeric mat 73 provides additional isolation by being placed between the base plate and the floor.

Machine base isolators are properly designed when they exhibit a fundamental or natural frequency or period approximating the frequency of the principal machine vibration that the isolator is to encounter. Since the natural frequency of the isolator is proportional to the square root of the mass that the isolator is to support divided by the stiffness of the elastomeric material, the stiffness of the elastomeric pads of the present invention may be altered and designed to yield a desired natural frequency or period. Since the mass that the isolator is to support may vary with the respective application or may vary depending on the specific location on a particular machine or piece of equipment that the isolator is to be placed, it is important that this fundamental or natural frequency or period of the isolator not change in response to such change in supported mass. Therefore, the stiffness of the elastomer should increase or decrease in direct relation to the square root of the mass that the elastomer is to support. Therefore, if the force/deflection characteristic of the elastomer exhibits an exponential curvature such that the force required for a given deflection increases as the square of the deflection, then the stiffness of the elastomeric material will provide a natural frequency to the machine base isolator that is relatively independent of the mass that the isolator is to support. This stiffness may be modified by the selection of different elastomers having different durometer hardnesses. The stiffness may also be altered, as in the embodiments chosen for illustration, by providing holes uniformly placed about the central axis of the pad to facilitate expansion of the pad under compression. The addition of such holes, or more properly the deletion of material within the holes, permits greater ease with which the pad can "bulge" and thus deform.

The elastomeric material of the respective pads 31-34 may be chosen to provide a predetermined stiffness so that the isolator mount can be tuned to a particular intended machine loading. For example, since the loadings to be encountered by the isolator mount are both static as well as dynamic, the dynamic characteristics of the load are important and the natural frequency or period of the respective mounts become important. It is therefore possible to select the stiffness of the elastomer to derive a natural frequency approximating the natural frequency of the anticipated dynamic machine load. The stiffness of the respective elastomeric materials may be modified through the utilization of design features such as the holes provided in each of the elastomeric pads. These holes increase the ability of the pad to "expand" under compressive loading and thus decrease the stiffness of the pad. The number and size of the holes may be empirically developed to meet a particular application.

An alternative to the elastomeric pad holes is shown in FIG. 5 wherein it may be seen that the steel separators, such as separator 80, may be provided with a plurality of openings 82 therein while the corresponding elastomeric pad 84 is solid except for the centrally disposed hole 85 to permit the attachment means or bolt to pass therethrough. The stiffness modification scheme shown in this latter figure provides a stiffening effect for the elastomer; that is, the effect of the holes in the steel plate is to discourage displacement of the contacting elastomer and thus reduce its tendency to bulge. The effective stiffness of the elastomer pad is thus increased. Typical machine applications for the isolator mount of the present invention include machine systems having fundamental frequencies ranging from 200 to 1,000 RPM, with the more typical applications encountering natural machine frequencies of 600 to 3,000 RPM. Under such applications, a machine base isolator having a natural frequency in the neighborhood of 300 to 900 RPM would be ideal. In the embodiment chosen for illustration, the elastomeric pads formed of 3 inch diameter ⅜ inch thick rubber material having a Durometer of 50 and a Shore hardness of "A" positioned in the manner shown in the figures has been found to provide a natural frequency in the neighborhood of 560 RPM. Such machine base isolator would be an appropriate mount for supporting a 2,000 pound load to provide machine vibration isolation, especially for machines operating at 1,400 RPM or higher.

The selection of the elastomeric material, modified through form such as arranging holes within the respective pads, or arranging holes within the steel separators, provides an isolator having a predetermined natural frequency which may be placed anywhere in a supporting position with respect to a machine. The frequency of the isolator, chosen because of the frequency encountered as a result of the operation of the machine, will not change even though the force or weight supported by the respective isolators may radically vary depending on their respective positions.

It is important that the machine base isolator also provide seismic isolation. In this regard, the machine base isolator shown in the accompanying figures provides seismic isolation through the elastomeric deformation of the elastomers 62 and 64 within the enclosure 60 resulting from the angular displacement of the bolt caused by the sheer forces imposed by the machine mass in response to relative motion between the floor and the machine base induced by seismic motion. Such motion is impeded by the isolator and the absorbed energy is dissipated in the form of heat. Energy is absorbed in the elastomers 62 within the enclosure 60 as well as the deformation of the elastomer 27 bonded to the fender washers 29 and 30. In addition, horizontal displacement of the bolt creates relative motion between successive elastomeric pads 31-34 and intervening metal separators 36-38. The friction thus induced also absorbs energy. It may be possible to increase energy absorption in seismic environments through the utilization of contacting steel plates in the format such as that shown in FIGS. 6, 7 and 8. In the latter figures, the respective rubber pads 85 are separated by pairs of steel plates 86, 87 and 88, 89 that are in contact with each other. A lateral displacement of the attachment means or bolts results in relative movement between contacting steel plates thus absorbing energy and dissipating same in the form of heat.

In the event of catastrophic seismic disturbances, the keyed interlocked joint formed by the reference plate 20 and the enlarged bolt head 16 prevent complete separation and thus avoid disengagement of the machine base at the corresponding anchoring position. Under such catastrophic seismic disturbances, the elastomer within the enclosure as well as the elastomer bonded between the fender washers continues to oppose and resist lateral motion induced by the seismic disturbance at an increasing rate as the displacement becomes greater. In catastrophic modes, bending of the bolt and distortion of the reference plate may occur. The result of such seismic disturbance may therefore be the requirement to replace the machine base isolator but will not result in machine damage.

The present invention has been described in terms of a specific embodiment incorporating details to facilitate the understanding of the principles of the construction and operation of the invention. Such reference herein to a specific embodiment and details thereof is not intended to limit the scope of the claims appended hereto. For example, the machine base isolator of the present invention is intended to contact and support a machine through the machine base; however, it will be obvious to those skilled in the art that a machine, several machines, or a combination of equipment may be attached to the subframe which in turn forms the basis for attachment to the machine base isolators. Therefore, as used herein, the term "machine base" should be construed to include integral support members of machines as well as supplemental supports or subframes. It will be apparent to those skilled in the art that modifications may be made in the embodiment chosen for illustration without departing from the spirit and scope of the invention.

What is claimed is:

1. A machine base isolate comprising: attachment means for connection to a machine base including a first end for coupling a machine to be mounted and an anchoring end; a reference plate for receiving said anchoring end to form an interlocking joint therebetween; first elastomeric means positioned between said reference plate and said anchoring end; and second elastomeric means, positioned between said reference plate and said machine, and formed into a load bearing elastomeric pad having a predetermined stiffness selected to provide a given natural frequency; said attachment means comprising a bolt and said anchoring end comprising a bolt head, said bolt coupled to said machine by a nut and a pair of washers having elastomeric material therebetween.

2. The combination set forth in claim 1 including a base plate for attachment to a supporting surface such as a floor, and means for securing said reference plate to said base plate.

3. The combinations set forth in claim 2 including an enclosure positioned between said reference plate and said base plate surrounding said anchoring end.

4. The combination set forth in claim 3 including elastomeric material surrounding said anchoring end and filling said enclosure.

5. A machine base isolator comprising: attachment means for connection to a machine base including a first end for coupling to a machine to be mounted and an anchoring end; a base plate for attachment to a supporting surface such as a floor; a wall extending perpendicularly from said base plate to form an enclosure; a reference plate for receiving said anchoring end to form an interlocking joint therebetween, said reference plate positioned over said enclosure, and said attachment means extending through said reference plate into said enclosure with said anchoring means positioned within said enclosure; a first elastomeric means positioned within said reference plate and said anchoring end and filling said enclosure; second elastomeric means, positioned between said reference plate and said machine, and formed into a load bearing elastomeric pad having a predetermined stiffness selected to provide a given natural frequency.

6. The combination set forth in claim 5 including an elastomeric pad positioned on said base plate for contacting and maintaining separation between said base plate and said supporting surface.

7. A machine base isolator comprising: attachment means for connection to a machine base including a first end for coupling to a machine to be mounted and an anchoring end; a reference plate for receiving said anchoring end to form an interlocking joint therebetween; a first elastomeric means positioned between said reference plate and said anchoring end; a second elastomeric means comprising a plurality of elastomeric pads each having an opening surrounding said attachment means and separated from each other by rigid disks, said plurality of elastomeric pads positioned between said reference plate and said machine base; each of said elastomeric pads being cylindrical and each including a plurality of holes formed therein to alter the pad's stiffness.

8. The combination set forth in claim 7 wherein said elastomeric pads are formed from a selected elastomeric material and are conformed to approximately provide a predetermined natural isolator frequency.

9. The combination set forth in claim 8 wherein said rigid disks include holes formed therein to alter the stiffness of elastomeric pads in contact therewith.

10. The combination set forth in claim 7 wherein said elastomeric pads are separated by rigid disks formed from pairs of metal disks, each disk of a pair of disks contacting the other and each contacting a different elastomeric pad.

11. A machine base isolator comprising: attachment means for connection to a machine base including a first end for coupling a machine to be mounted and an anchoring end; a reference plate for receiving said anchoring end to form an interlocking joint therebetween; first elastomeric means positioned between said reference plate and said anchoring end; and second elastomeric means, positioned between said reference plate and said machine, and formed into a load bearing elastomeric pad having a predetermined stiffness selected to provide a given natural frequency; a base plate for attachment to a floor or similar supporting structure; means defining an enclosure secured to said base plate and extending therefrom into contact with said reference plate to enclose said first elastomeric means; and a plurality of bolts extending between said base plate and said reference plate to clamp said reference plate in contact with said enclosure means.

* * * * *